United States Patent
Hoshino et al.

(10) Patent No.: US 7,391,546 B2
(45) Date of Patent: Jun. 24, 2008

(54) DISCRIMINATION MEDIUM AND DISCRIMINATION METHOD USING THE SAME

(75) Inventors: Hidekazu Hoshino, Yokohama (JP); Itsuo Takeuchi, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 183 days.

(21) Appl. No.: 10/557,001

(22) PCT Filed: May 14, 2004

(86) PCT No.: PCT/JP2004/006545

§ 371 (c)(1),
(2), (4) Date: Jan. 27, 2006

(87) PCT Pub. No.: WO2004/102234

PCT Pub. Date: Nov. 25, 2004

(65) Prior Publication Data

US 2007/0159671 A1    Jul. 12, 2007

(30) Foreign Application Priority Data

May 16, 2003  (JP) .............................. 2003-138353

(51) Int. Cl.
*G06K 7/10* (2006.01)
*G06K 9/74* (2006.01)
*G02F 1/1335* (2006.01)

(52) U.S. Cl. ................. 359/2; 349/96; 349/97; 349/98; 349/115; 349/175; 349/176; 356/71; 250/566

(58) Field of Classification Search .............. 349/96, 349/97, 98, 115, 175, 176, 193; 356/71, 356/364, 365; 359/2; 250/566
See application file for complete search history.

(56) References Cited

U.S. PATENT DOCUMENTS 6,061,122 A    5/2000  Hoshino et al. ............... 356/71
6,301,047 B1 * 10/2001  Hoshino et al. ............. 359/566

(Continued)

FOREIGN PATENT DOCUMENTS

JP    A 57-165480    10/1982    ................. 349/1 X (Continued)

*Primary Examiner*—Brian M Healy
(74) *Attorney, Agent, or Firm*—Oliff & Berridge, PLC

(57) ABSTRACT

A discrimination medium 10a includes a first double layered body 101 having a right-handed circular polarization polymer cholesteric liquid crystal layer 11 and a left-handed circular polarization polymer cholesteric liquid crystal layer 12 which are stacked. The right-handed circular polarization polymer cholesteric liquid crystal layer 11 reflects a specific right-handed circular polarization light, and the left-handed circular polarization polymer cholesteric liquid crystal layer 12 reflects a specific left-handed circular polarization light. The discrimination medium 10a is applied to the article 30, and is viewed via a simple determination tool 20 having a filter 21 allowing only right-handed circular polarization light to pass therethough and a filter 22 allowing only left-handed circular polarization light to pass therethough. As a result, the color of the right-handed circular polarization polymer cholesteric liquid crystal layer 11 is seen via the right-handed circular polarization light filter 21, and the color of the left-handed circular polarization polymer cholesteric liquid crystal layer 12 is seen via the right-handed circular polarization light filter 22. This unique phenomenon by the discrimination medium 10a which cannot be copied in general is confirmed, so that the authenticity of the article 30 can be determined easily and reliably.

18 Claims, 8 Drawing Sheets

U.S. PATENT DOCUMENTS

| | | | |
|---|---|---|---|
| 6,628,439 B2 * | 9/2003 | Shiozawa et al. | 359/2 |
| 6,806,930 B2 * | 10/2004 | Moia | 349/117 |
| 2002/0051264 A1 | 5/2002 | Shiozawa et al. | 359/2 |
| 2003/0085380 A1 | 5/2003 | Schuhmacher et al. | 252/299.7 |
| 2007/0077404 A1 * | 4/2007 | Hoshino et al. | 428/212 |
| 2007/0081144 A1 * | 4/2007 | Hoshino et al. | 356/71 |
| 2007/0159671 A1 * | 7/2007 | Hoshino et al. | 359/2 |

FOREIGN PATENT DOCUMENTS

| | | | |
|---|---|---|---|
| JP | A 58-17119 | 2/1983 | 349/1 X |
| JP | A 63-51193 | 3/1988 | 349/1 X |
| JP | A 09-319566 | 12/1997 | 349/1 X |
| JP | A 2000-255200 | 9/2000 | 349/1 X |
| JP | A 2000-273421 | 10/2000 | 349/1 X |

\* cited by examiner

DISCRIMINATION MEDIUM AND DISCRIMINATION METHOD USING THE SAME

TECHNICAL FIELD

The present invention relates to a discrimination medium for determining whether or not two-dimensional articles such as packages in which goods are packed, passports, cards, bills, exchange tickets for money, bonds, security notes, gift certificates, pictures, tickets, public game voting tickets, tags showing brand-logo marks, seals, labels etc. are authentic, and relates to a discrimination medium for determining whether or not various kinds of three-dimensional articles are authentic. In particular, the present invention relates to a discrimination medium and to a discrimination method using the discrimination medium which have difficulty in being falsified and facilitate determining the authenticity of the articles.

BACKGROUND ART

Conventionally, for example, a technique of applying a hologram on a surface of an article, and a technique of applying special ink on a surface of an article have been known as anti-falsification methods for articles, for example, for cards and security notes. In addition, a technique of randomly mixing a detectable material such as magnetic powder, magnetic fiber, metallic powder, or a metallic fiber in a paper has been known as anti-falsification methods. In the technique in which the hologram is used, the authenticity of the article on which the hologram is applied is determined by viewing the hologram, which appears to be three-dimensional or varies in color depending on the viewing angle. In the technique in which the special ink is used, for example, fluorescent ink or magnetic ink may be used as the special ink. The authenticity of the article on which the above ink is applied is determined by detecting information hidden in the above ink by irradiating ultraviolet light thereon or by magnetic sensors, although the above ink may be viewed in the same manner as normal inks. In the technique in which a paper is used in which the above detectable material is randomly mixed, an individual distribution pattern thereof is recorded beforehand, and the authenticity of the article is determined by detecting a distribution pattern thereof when it is used again, and then by comparing it with the recorded pattern.

In Patent Publication 1, a falsification technique is disclosed in which a cholesteric liquid crystal is combined with a hologram. In this technique, a color change of the cholesteric liquid crystal which depends on the viewing angle is used together with a latent image of the hologram which changes depending on the viewing angle thereof. Alternatively, a reflecting characteristic of circular polarization of the cholesteric liquid crystal, in which left-handed circular polarization light or right-handed circular polarization light is selectively reflected and the reflected light has the same circular polarization direction as the incident light, is used together therewith. In Patent Publication 2, a technique is disclosed in which a characteristic of a cholesteric liquid crystal reflecting a specific circular polarization light and a characteristic of changing wavelength of the reflected light depending on the viewing angle are used.

However, the above falsification techniques have become more sophisticated as hologram manufacturing techniques have come into wider use, it is easy to falsify the hologram, and the falsified hologram cannot thereby be distinguished from an authentic one. Although the technique using the fluorescent ink or the magnetic ink, or the paper into which the detectable material such as magnetic powder, magnetic fiber, metallic powder, or metallic powder is mixed, is difficult to be falsified, a device for sensing information hidden in the above inks and a device for detecting the distribution pattern on the above paper are very large and require a power supply. Therefore, the above technique cannot be used when easy execution is required. In the techniques in which the cholesteric liquid crystal is used together with the hologram, more complicated structures have been required as hologram manufacturing techniques have come into wide use. Anti-falsification techniques are required in which it is difficult to falsify a discrimination medium and which facilitate determining the authenticity of the discrimination medium.

In the Patent Publication 1, the cholesteric liquid crystal is used together with the hologram, refleced light therefrom is observed through a left-handed circular polarization light filter and a right-handed circular polarization light filter. For example, when the reflected light therefrom can be seen through a left-handed circular polarization light filter, the reflected light therefrom cannot be seen through a right-handed circular polarization light filter. By using this phenomenon, the authenticity of discrimination medium is determined. However, in the above manner, one portion of the discrimination medium turns black and only the image at the portion cannot be seen, so that falsified articles may produced by employing circular polarization light filters.

In the Patent Publication 2, when a discrimination medium having two laminated pieces of cholesteric liquid crystal is viewed through liquid crystal filters having the same characteristics, the discrimination medium changes in color depending on the liquid crystal filter corresponding thereto. By using this phenomenon, the authenticity of the discrimination medium is determined. However, a simple determination tool having the same liquid crystal as the above cholesteric liquid crystal is not widely used, so that a test apparatus is required in accordance with the cholesteric liquid crystal.

The Patent Publication 1 is Japanese Patent Application Publication No. Hei 9-319566. The Patent Publication 2 is Japanese Unexamined Patent Publication No. Hei 11-42875.

DISCLOSURE OF THE INVENTION

Problems Solved by the Invention

Therefore, objects of the present invention are to provide a discrimination medium which can prevent being falsified, facilitates determining the authenticity of articles reliably, and to provide a discrimination method using the same.

Means for Solving the Problems

The first aspect of the present invention provides a discrimination medium for determining the authenticity of an article by providing an optically discriminable mark on the article includes: a first double layered body having a right-handed circular polarization polymer cholesteric liquid crystal layer and a left-handed circular polarization polymer cholesteric liquid crystal layer which are stacked, the right-handed circular polarization polymer cholesteric liquid crystal layer reflecting specific right-handed circular polarization light, the left-handed circular polarization polymer cholesteric liquid crystal layer reflecting specific left-handed circular polarization light; and a protection film layer provided on an outside of the first double layered body, the protection film layer protecting the circular polarization polymer cholesteric liquid crystal layers, the outside of the first double layered body being opposite to the article.

The first aspect of the present invention provides a discrimination method for discriminating a discrimination medium for determining the authenticity of an article by providing an optically discriminable mark on the article. The discrimination method includes: a first double layered body having a right-handed circular polarization polymer cholesteric liquid crystal layer and a left-handed circular polarization polymer cholesteric liquid crystal layer which are stacked, the right-handed circular polarization polymer cholesteric liquid crystal layer reflecting specific right-handed circular polarization light, the left-handed circular polarization polymer cholesteric liquid crystal layer reflecting specific left-handed circular polarization light; and a protection film layer provided on an outside of the first double layered body, the protection film layer protecting the circular polarization polymer cholesteric liquid crystal layers, the outside of the first double layered body being opposite to the article. The method includes: viewing the discrimination medium on the article via a simple determination tool having a filter allowing only right-handed circular polarization light to pass therethough and a filter allowing only left-handed circular polarization light to pass therethough. Color of the right-handed circular polarization polymer cholesteric liquid crystal layer is seen via the filter allowing only right-handed circular polarization light to pass therethough, and color of the left-handed circular polarization polymer cholesteric liquid crystal layer is seen via the filter allowing only left-handed circular polarization light to pass therethough. As a result, the authenticity of the article is determined.

The basic principle of the present invention will be described hereinafter. FIG. 1 schematically shows a structure of a cholesteric liquid crystal. The cholesteric liquid crystal has a layered structure. The molecular long axis directions of the respective layers of the layered structure are parallel to each other, and are parallel to the plane thereof. The respective layers are rotated slightly with respect to the adjacent layer so as to be stacked, and the cholesteric liquid crystal thereby has a three-dimensional spiral structure. Denoting that pitch P is a distance needed when a direction factor of the molecular long axis direction is rotated through 360 degrees and is restored to an initial state, and an average refractive index of the respective layers is index N, the cholesteric liquid crystal selectively reflects specific circular polarization light having a center wavelength $\lambda s$ satisfying the equation $\lambda s = N \times P$ (circular polarization light selectivity). Therefore, when the molecular long axis direction of the respective layers of the cholesteric liquid crystal is rotated in a clockwise direction with respect to incident light, right-handed circular polarization light having a center wavelength $\lambda s$ is reflected by the cholesteric liquid crystal as it is, and left-handed circular polarization light passes though the cholesteric liquid crystal. This is contrast to when right-handed polarization light is changed into left-handed polarization by reflection on a typical medium. All light other than the left-handed circular polarization light passes through the cholesteric liquid crystal. For example, cholesteric liquid crystal reflecting light of a red center wavelength $\lambda s$ may be disposed on a material, which absorbs visible light, such as a black sheet. When the cholesteric liquid crystal on the material is exposed to random polarization light such as sunlight, only right-handed circular polarization light of a center wavelength $\lambda s$ is reflected by the cholesteric liquid crystal, light transmitted through the cholesteric liquid crystal is absorbed by the black sheet, and the cholesteric liquid crystal thereby appears to be clearly red.

The cholesteric liquid crystal changes color depending on the viewing angle. When incident light obliquely enters into the cholesteric liquid crystal, the apparent pitch P decreases, and the center wavelength $\lambda s$ is thereby short. For example, the color of light, which is reflected by the cholesteric liquid crystal which has a red color when incident light entering perpendicularly thereto is observed, shifts to orange, yellow, green, blue-green, and blue in turn as the viewing angle is larger. This phenomenon is called blue shift.

Therefore, in the first aspect of the present invention, when the discrimination medium is exposed to natural light, only (for example, left-handed and red) circular polarization light of light passing through the protection film layer corresponds to the rotation direction and the pitch P (corresponding to, for example, red) of the first (for example, left-handed) circular polarization polymer cholesteric liquid crystal layer, thereby being reflected by the first circular polarization polymer cholesteric liquid crystal layer as it is. Then, the reflected left-handed and red circular polarization light of light passes through the protection film layer again, and exits to the outside. Light other than the left-handed and red circular polarization light passes though the first circular polarization polymer cholesteric liquid crystal layer, and reaches the second (in this case, right-handed) circular polarization polymer cholesteric liquid crystal layer. Since the rotation directions of the first and the second circular polarization polymer cholesteric liquid crystal layers are opposite to each other, only (for example, right-handed and green) circular polarization light of light passing through the first circular polarization polymer cholesteric liquid crystal layer corresponds to the rotation direction and the pitch P (corresponding to, for example, green) of the second circular polarization polymer cholesteric liquid crystal layer, thereby being reflected by the second right-handed circular polarization polymer cholesteric liquid crystal layer as it is. Then, the reflected right-handed and green circular polarization light passes through the first circular polarization polymer cholesteric liquid crystal layer and the protection film layer again, and exits to the outside. Light other than the right-handed and green circular polarization light passes though the second circular polarization polymer cholesteric liquid crystal layer, and reaches the (for example, blue) article. The light reaching there is reflected by the surface of the article, passes through in turn the second circular polarization polymer cholesteric liquid crystal layer, the first circular polarization polymer cholesteric liquid crystal layer, and the protection film layer, and exits to the outside. When the light exiting from the discrimination medium is viewed, the color of the discrimination medium is approximately seen as white into which red, green, and blue are combined. When the light exiting from the discrimination medium is viewed via the left-handed circular polarization light filter allowing only left-handed circular polarization light to pass therethrough, the light exiting from the discrimination medium appears to be red. When the light exiting from the discrimination medium is viewed via the right-handed circular polarization light filter allowing only right-handed circular polarization light to pass therethrough, the light exiting from the discrimination medium appears to be green. When the viewing angle is changed, these colors show blue-shift phenomena, and the change of these colors can be observed. When the discrimination medium is viewed via the left-handed circular polarization light filter or the right-handed circular polarization light filter which is disposed closely thereto, since the left-handed circular polarization light or the right-handed circular polarization light is separated from the incident light, the color corresponding to the pitch of the circular polarization polymer cholesteric liquid crystal layer can be confirmed more clearly. The characteristics of this discrimination medium are very different from those of a common discrimination medium, and reliably facilitate determining the authenticity of article.

The second aspect of the present invention provides a discrimination medium for determining the authenticity of an article by providing an optically discriminable mark on the article, including: a second double layered body having two circular polarization polymer cholesteric liquid crystal layers which are stacked, the two circular polarization polymer cholesteric liquid crystal layers reflecting specific right-handed circular polarization light or specific left-handed circular polarization light; a half-wave plate layer provided between the circular polarization polymer cholesteric liquid crystal layers, the half-wave plate layer changing right-handed circular polarization of transmitted light to left-handed circular polarization thereof or changing left-handed circular polarization of transmitted light to right-handed circular polarization thereof; and a protection film layer provided on an outside of the second double layered body, the protection film layer protecting the circular polarization polymer cholesteric liquid crystal layers, the outside second double layered body being opposite to the article.

The second aspect of the present invention provides a discrimination method for discriminating a discrimination medium for determining the authenticity of an article by providing an optically discriminable mark on the article. The discrimination method includes: a second double layered body having two same direction circular polarization polymer cholesteric liquid crystal layers which are stacked, the two circular polarization polymer cholesteric liquid crystal layers reflecting specific right-handed circular polarization light or specific left-handed circular polarization light; a half-wave plate layer provided between the circular polarization polymer cholesteric liquid crystal layers, the half-wave plate layer changing right-handed circular polarization of transmitted light to left-handed circular polarization thereof or changing left-handed circular polarization of transmitted light to right-handed circular polarization thereof; and a protection film layer provided on an outside of the second double layered body, the protection film layer protecting the circular polarization polymer cholesteric liquid crystal layers, the outside of the second double layered body being opposite to the article. The method includes: viewing the discrimination medium on the article via a simple determination tool having a filter allowing only right-handed circular polarization light to pass therethough and a filter allowing only left-handed circular polarization light to pass therethough, wherein color of the circular polarization polymer cholesteric liquid crystal layer proximate to the protection layer and color of the circular polarization polymer cholesteric liquid crystal layer proximate to the article are separately seen via the filter allowing only right-handed circular polarization light to pass therethough and the filter allowing only left-handed circular polarization light to pass therethough. As a result, the authenticity of the article is determined.

The wave plate used in the second aspect of the present invention will be explained hereinafter. In the case in which a distribution of refractive index of transparent film in a vertical direction on the film is different from that in a horizontal direction thereon, phase shift occurs between the vertical direction component of light and the horizontal direction component of light. This film is optically anisotropic. In contrast, an optical isotropy film is a film in which the above phase shift does not occur. The phase shift depends on the differences in the refractive index and thickness of the film. For example, linearly polarized light passes through a quarter-wave film, thereby changing to circular polarization light. Circular polarization light passes through a half-wave film, thereby changing into circular polarization light having a polarization direction opposite to that of the above circular polarization light. A circular polarization light filter which allows circular polarization light having a specific polarization direction to pass therethrough can be produced by using this quarter-wave plate and a polarization light filter.

In the second aspect of the present invention, when the discrimination medium for an article is exposed to natural light, only (for example, left-handed and red) circular polarization light of light passing through the protection film layer corresponds to the rotation direction and the pitch P (corresponding to, for example, red) of the first circular polarization polymer cholesteric liquid crystal layer, thereby being reflected by the first (for example, left-handed) circular polarization polymer cholesteric liquid crystal layer as it is. Then, the reflected left-handed and red circular polarization light passes through the protection film layer again, and exits to the outside. Light other than the left-handed and red circular polarization light passes though the first circular polarization polymer cholesteric liquid crystal layer and the half-wave plate layer. At this time, the polarization direction of the light other than the left-handed and red circular polarization light changes to the opposite direction, and this light reaches the second (in this case, left-handed) circular polarization polymer cholesteric liquid crystal layer. Only (for example, left-handed and green) circular polarization light of light passing through the half-wave plate layer corresponds to the rotation direction and the pitch P (corresponding to, for example, green) of the second circular polarization polymer cholesteric liquid crystal layer, thereby being reflected by the second left-handed circular polarization polymer cholesteric liquid crystal layer as it is. The reflected left-handed and green circular polarization light passes through the half-wave plate layer, so that the polarization direction thereof changes to the opposite polarization direction (right-handed circular polarization direction). Then, this right-handed and green circular polarization light passes through the first left-handed circular polarization polymer cholesteric liquid crystal layer and the protection film layer, and exits to the outside. Light other than the left-handed and green circular polarization light passes through the second circular polarization polymer cholesteric liquid crystal layer, and reaches the (for example, blue) article. The light reaching there is reflected by the surface of the article, passes through in turn the second circular polarization polymer cholesteric liquid crystal layer, the first circular polarization polymer cholesteric liquid crystal layer, and the protection film layer, and exits to the outside. When the light exiting from the discrimination medium is viewed under natural light, the color of the discrimination medium is approximately seen as white into which red, green, and blue are is combined. When the light exiting from the discrimination medium is viewed via the left-handed circular polarization light filter allowing only left-handed circular polarization light to pass therethrough, the light exiting from the discrimination medium appears to be red. When the light exiting from the discrimination medium is viewed via the right-handed circular polarization light filter allowing only right-handed circular polarization light to pass therethough, the light exiting from the discrimination medium appears to be green. When the viewing angle is changed, these colors show blue-shift phenomena, and the change of these colors can be observed. When the discrimination medium is viewed via the left-handed circular polarization light filter or the right-handed circular polarization light filter which is disposed closely thereto, since the left-handed circular polarization light or the right-handed circular polarization light is separated from the incident light, the color corresponding to the pitch of the circular polarization polymer cholesteric liquid crystal layer can be confirmed more clearly. The characteristics of this discrimination medium are very different from those of a common discrimination medium, and reliably facilitate determining the authenticity of article.

According to a preferred embodiment of the present invention, the discrimination medium may further include a corrugated hologram forming layer provided to at least one of the two circular polarization polymer cholesteric liquid crystal layers. In this feature, the authenticity of the article can be reliably determined not only by change of color but also by change of pattern and change of design.

According to a preferred embodiment of the present invention, the discrimination medium may further include a corrugated hologram forming layer provided on at least one side of the protection layer and the article, the side being proximate to the circular polarization polymer cholesteric liquid crystal layer, wherein the circular polarization polymer cholesteric liquid crystal layer may be formed on the hologram forming layer, and has an uniform thickness so as to extend along the corrugated shape of the hologram forming layer. In this feature, since the hologram forming layer is closer to the eyes than the circular polarization polymer cholesteric liquid crystal layer, the pattern of the hologram forming layer can be seen more clearly, so that the authenticity of article can be reliably determined.

According to the third aspect of the present invention, the discrimination medium may further include: a corrugated hologram forming layer provided on at least one of the two circular polarization polymer cholesteric liquid crystal layers of the first double layered body. The method may include: viewing the discrimination medium on the article via a simple determination tool having a filter allowing only right-handed circular polarization light to pass therethough and a filter allowing only left-handed circular polarization light to pass therethough. Color of the right-handed circular polarization polymer cholesteric liquid crystal layer may be seen via the filter allowing only right-handed circular polarization light to pass therethough, and a pattern of the hologram may be seen therevia when the right-handed circular polarization polymer cholesteric liquid crystal layer has the corrugated hologram forming layer. Color of the left-handed circular polarization polymer cholesteric liquid crystal layer may be seen via the filter allowing only left-handed circular polarization light to pass therethough and a pattern of the hologram may be seen therevia when the left-handed circular polarization polymer cholesteric liquid crystal layer has the corrugated hologram forming layer. As a result, the authenticity of the article may be determined.

In the third aspect of the present invention, in the same manner in the first aspect of the present invention, when the discrimination medium for an article is exposed to natural light, only (for example, left-handed and red) circular polarization light of light passing through the protection film layer corresponds to the rotation direction and the pitch P (corresponding to, for example, red) of the first circular polarization polymer cholesteric liquid crystal layer, thereby being reflected by the first (for example, left-handed) circular polarization polymer cholesteric liquid crystal layer as it is. In the case in which the first circular polarization polymer cholesteric liquid crystal layer has the hologram forming layer, the left-handed and red circular polarization light is reflected to have the pattern of the hologram forming layer, passes through the protection film layer again, and exits to the outside. Light other than the left-handed and red circular polarization light passes though the first circular polarization polymer cholesteric liquid crystal layer, and reaches the second circular polarization polymer cholesteric liquid crystal layer. Since the rotation directions of the first and second circular polarization polymer cholesteric liquid crystal layers are opposite to each other, only (for example, right-handed and green) circular polarization light of light passing through the first circular polarization polymer cholesteric liquid crystal layer corresponds to the rotation direction and the pitch P (corresponding to, for example, green) of the second circular polarization polymer cholesteric liquid crystal layer, thereby being reflected by the second circular polarization polymer cholesteric liquid crystal layer as it is. In the case in which the second circular polarization polymer cholesteric liquid crystal layer has the hologram forming layer, the right-handed and green circular polarization light is reflected to have the pattern of the hologram forming layer, passes through the first circular polarization polymer cholesteric liquid crystal layer and the protection film layer again, and exits to the outside. Light other than the right-handed and green circular polarization light passes though the second circular polarization polymer cholesteric liquid crystal layer, and reaches the article. In the case in which the article has a pattern, the light reaching there is reflected by the surface of the article to have the pattern of the article, passes through in turn the second circular polarization polymer cholesteric liquid crystal layer, the first circular polarization polymer cholesteric liquid crystal layer, and the protection film layer, and exits to the outside. When the light exiting from the discrimination medium is viewed, the color of the discrimination medium is approximately seen as yellow into which red and green are combined, and three patterns can be seen in the case in which the first circular polarization polymer cholesteric liquid crystal layer, the second circular polarization polymer cholesteric liquid crystal layer, and the article have the patterns. When the light exiting from the discrimination medium is viewed via the left-handed circular polarization light filter allowing only left-handed circular polarization light to pass therethough, the light exiting from the discrimination medium appears to be red. In this case, when the first circular polarization polymer cholesteric liquid crystal layer has the hologram forming layer, the pattern thereof can also be seen. When the light exiting from the discrimination medium is viewed via the right-handed circular polarization light filter allowing only right-handed circular polarization light to pass therethough, the light exiting from the discrimination medium appears to be green. In this case, when the second circular polarization polymer cholesteric liquid crystal layer has the hologram forming layer, the pattern thereof can also be seen. When the viewing angle is changed, these colors show blue-shift phenomena, and the change of these colors can be observed. When the discrimination medium is viewed via the left-handed circular polarization light filter or the right-handed circular polarization light filter which is disposed closely thereto, since the left-handed circular polarization light or the right-handed circular polarization light is separated from the incident light, the color and the pattern can clearly be confirmed more clearly. The characteristics of this discrimination medium are very different from those of a common discrimination medium, and reliably facilitate determining the authenticity of article.

According to the fourth aspect of the present invention, the discrimination medium may further include: a corrugated hologram forming layer provided on at least one of the circular polarization polymer cholesteric liquid crystal layers of the second double layered body. The method may include: viewing the discrimination medium on the article via a determination simple tool having a filter allowing only right-handed circular polarization light to pass therethough and a filter allowing only left-handed circular polarization light to pass therethough. Color of the circular polarization polymer cholesteric liquid crystal layer proximate to the protection layer may be seen via the one of the filters, and a pattern of the hologram is seen therevia when the circular polarization polymer cholesteric liquid crystal layer proximate to the protection layer has the corrugated hologram forming layer. Color of the circular polarization polymer cholesteric liquid crystal layer proximate to the article may be seen via the other filter, and a pattern of the hologram may be seen therevia when the circular polarization polymer cholesteric liquid crystal layer proximate to the article has the corrugated hologram forming layer. As a result, the authenticity of the article may be determined.

In the fourth aspect of the present invention, in the same manner as in the second aspect of the present invention, when the discrimination medium for an article is exposed to natural light, discrimination can be performed by the color difference between the condition in which the discrimination medium is viewed via each of the left-handed and the right-handed circular polarization light filters of the simple determination tool and the condition in which the discrimination medium is viewed under natural light. In addition, discrimination can be performed by the following differences therebetween. For example, when the discrimination medium for an article is exposed to natural light, the color and the pattern of the surface of the article, and the colors of the first and the second circular polarization polymer cholesteric liquid crystal layers can be seen harmoniously. In this case, when at least one of the circular polarization polymer cholesteric liquid crystal layers has hologram forming layer, the pattern of the hologram forming layer can also be seen. On the other hand, when the discrimination medium is viewed via the left-handed and the right-handed circular polarization light filters, each color of the circular polarization polymer cholesteric liquid crystal layers reflecting the light which passes through the circular polarization light filters of the simple determination tool, and the pattern of the hologram forming layer can be seen harmoniously in the case in which the circular polarization polymer cholesteric liquid crystal layer has the hologram forming layer. When the discrimination medium is viewed via a left-handed circular polarization light filter or a right-handed circular polarization light filter which is disposed closely thereto, since the left-handed circular polarization light or the right-handed circular polarization light is separated from the incident light, the color corresponding to the pitch of the circular polarization polymer cholesteric liquid crystal layer can be seen more clearly. The characteristics of this discrimination medium are very different from a common discrimination medium, and reliably facilitate determining the authenticity of article.

According to a preferred embodiment of the present invention, the circular polarization polymer cholesteric liquid crystal layers of the first double layered body or the second double layered body preferably have spiral structures having pitches which are different from each other. In this feature, the authenticity of article can be determined by the color difference between the condition in which the discrimination medium is viewed via the circular polarization light filters of the simple determination tool and the condition in which the discrimination medium is viewed under natural light. In this case, since the colors when the discrimination medium is viewed via the right-handed and the left-handed circular polarization light filters of the simple determination tool are different from each other, the authenticity of article can be easily and reliably determined.

According to a preferred embodiment of the present invention, the hologram forming layers of the double layered body preferably have patterns which are different from each other. In this feature, the authenticity of article can be determined by the color and the pattern differences between the condition in which the discrimination medium is viewed via the circular polarization light filters of the simple determination tool and the condition in which the discrimination medium is viewed under natural light. In this case, since the colors and the patterns when the discrimination medium is viewed via the right-handed and the left-handed circular polarization light filters of the simple determination tool are different from each other, the authenticity of article can be easily and reliably determined.

According to a preferred embodiment of the present invention, the discrimination medium further preferably includes an adhesive layer provided on an outside of the discrimination medium, the outside being proximate to the article. In this feature, the discrimination medium can be applied to the article easily.

In the present invention, the adhesive layer preferably contains a black pigment. In this feature, when the article is viewed under natural light, the surface condition of the article cannot be seen, and the colors of the first and the second circular polarization polymer cholesteric liquid crystal layers can have metallic luster. When the article is viewed via the right-handed and the left-handed circular polarization light filters of the simple determination tool, only colors of the first and the second circular polarization polymer cholesteric liquid crystal layers corresponding to the respective filters are clearly seen to have metallic luster. In the case in which the circular polarization polymer cholesteric liquid crystal layer has the hologram forming layer, when the article is viewed under natural light, the two patterns having metallic luster can be clearly seen to be overlapped. When the article is viewed via each of the circular polarization light filter, the color of the right-handed circular polarization light and the pattern of the hologram forming layer can be seen clearly so as to have metallic luster via the right-handed circular polarization light filter, and the color of the left-handed circular polarization light and the pattern of the hologram forming layer can be seen clearly so as to have metallic luster via the left-handed circular polarization light filter. As a result, the authenticity of article can be easily and reliably determined.

EFFECTS OF THE INVENTION

In the present invention, since the double layered body having the double layered body having the two cholesteric liquid crystal layers and the patterns of the two holograms are used together, the respective colors and the respective patterns can be seen differently from the condition in which the discrimination medium is viewed under natural light and the condition in which the discrimination medium is viewed via the right-handed and the left-handed polarization light filters of the simple determination tool, good effects can be obtained such that the authenticity of article can be easily and reliably determined.

BEST MODE FOR CARRYING OUT THE INVENTION

An embodiment of the present invention will be explained hereinafter. A polymer cholesteric liquid crystal can be manufactured by methods disclosed in, for example, Japanese Unexamined Patent Application Publication No. S63-51193, Japanese Unexamined Patent Application Publication No.

S57-165480, and Japanese Unexamined Patent Application Publication No. S58-17119. For example, a low molecular cholesteric liquid crystal is dissolved and maintained in a polymerized monomer, so that cholesteric liquid crystals grow. After that, the low molecular liquid crystals are joined by photoreaction or thermal reaction, so that the molecular orientation thereof is fixed, and the low molecular liquid crystal is formed into a polymer thereof. Alternatively, thermo-tropic polymer liquid crystal of branched-chain type or straight-chain type may be heated above the transition point thereof, so that a cholesteric liquid crystal structure thereof grows, and may be then cooled to a temperature below the transition point thereof, so that the molecular orientation thereof is fixed. Alternatively, lyotropic liquid crystal of the branched-chain type or straight-chain type may be oriented in a cholesteric orientation in a solvent, and the solvent may be gradually evaporated, so that molecular orientation thereof is fixed.

For example, a branched-chain type polymer having liquid crystal forming group in a branched-chain, such as polyacrylate, polymethacrylate, polysiloxane, or polymeronate, and a straight-chain type polymer having liquid crystal forming group in a straight chain, such as polyester, polyester amide, polycarbonate, polyamide, or polyimide, may be mentioned as a polymer cholesteric liquid crystal.

The above polymer cholesteric liquid crystal can be produced by applying a raw material liquid to one side of a base film composed of a thin plastic film (for example, polyethylene terephthalate (PET) film), and then fixing cholesteric orientation and molecular orientations thereof, and so on. The base film has a protection film, an isotropic film, a half-wave plate layer, or a peeling layer. In this case, for example, the polymer cholesteric liquid crystal has a uniform torsion pitch P corresponding to a left-handed circular polarization direction extending in a molecular layered direction thereof, and has a thickness of about 0.1 to 5.0 μm. Although in general, the polymer cholesteric liquid crystal layer is protected by a protection film and an isotropic film, etc., the base film is peeled from the peeling layer when hot melt is performed thereon, and, in some cases, the peeling layer is peeled therefrom, so that the surface of the polymer cholesteric liquid crystal layer is exposed. Characters may be printed on the polymer cholesteric liquid crystal layer.

A hologram is structured such that a desired pattern, a desired image, or a desired character is formed by controlling grid intervals and diffraction directions of a diffraction grating at small regions having pixel sizes, the diffraction grating being formed on the article. The hologram may be classified into two types which are a cubic type and a plane type based on the structure thereof. The hologram is classified into an amplitude-type and a phase-type based on the optical modulation system. A phase modulation flat type hologram (embossed hologram) which enables mass reproduction thereof by a micro replica method using a master pattern is widely used industrially.

The hologram forming layer is formed by transferring from a master pattern on a side of a circular polarization polymer cholesteric liquid crystal layer, a protection film, an isotropic film, or a half-wave plate. This is called embossing. A method for the transferring is a heating and pressing method using a pressing machine, a rolling machine, a calender roll, a laminator, or a stamper. Although recesses and protrusions are formed by the embossing, influences of the recesses and the protrusions are exerted only to a surface of circular polarization polymer cholesteric liquid crystal layer or surfaces of various films but also to insides thereof. The hologram forming layer includes the recesses, the protrusions, and the insides to which the above influence are exerted.

A protection film is a layer for protecting a circular polarization polymer cholesteric liquid crystal layer. A material of the protection film can be selected from the group consisting of acrylic resin, urethane resin, epoxy resin, silicon resin, EVA resin, polyamide resin, polyester resin, polystyrene resin, cellulose resin, or mixtures thereof. The material of the protection film is not limited thereto. Although the material of the protection film is appropriately selected in accordance with smoothness, hard coating characteristic, abrasion resistance, etc., which are required depending on use, the protection layer is not necessarily required depending on characteristics of a circular polarization polymer cholesteric liquid crystal layer.

An anisotropic film which is used for a half-wave plate or an isotropic film, through which light passes as it is, is desirably made of plastic. For example, the plastic may be polycarbonate, polyvinyl alcohol, polysulfone, polyethylene, polypropylene, polystyrene, polyalylate, polyethylene telephthalate, triacetylcellulose, diacetylcellulose, or polyethylene-ethylvinyl alcohol. The plastic is not limited thereto. When the plastic is used for the anisotropic film, anisotropy of the plastic is controlled to be appropriately subjected to working such as drawing in one direction.

Common adhesives used for an adhesive layer are classified roughly into an acrylic type of adhesive, a rubber-type of adhesive, and a silicone-type of adhesive based on a main component thereof. An adhesive which is suitable for a base material and an adhered body is appropriately selected from the above types. In general, the acrylic type is highly flexible in seals and labels, and is easily used since the acrylic type is a mixture having a wide mixing range. A polyester type of adhesive, polyurethane type of adhesive, and a nylon type of adhesive are used for a hot melt adhesive in adhesives in the case in which the adhesive is classified based on a main component thereof. An adhesive which is suitable for a base material and an adhered body is appropriately selected from the above types. A dark color pigment or a dark color dye, for example, a carbon powder, is mixed into these adhesive layers, so that the adhesive layer can have a dark color. When a color of an article and a design, etc., are not desired to be vibisle, a nonwhite pigment composed of titanium oxide or chrome yellow, etc., may be mixed thereinto. The adhesion of these adhesive layers is stronger than the interlayer bonding strength of the cholesteric liquid crystal layer, so that in the case in which a discrimination medium is applied to an article, the discrimination medium cannot be removed from the article without breaking the cholesteric liquid crystal layer. As a result, since the discrimination medium cannot be reused, the authenticity of the article can be ensured.

EXAMPLES

The details of the present invention will be explained hereinafter by describing Examples of practical production methods.

Example 1

FIG. 2 shows a cross sectional view of a discrimination medium 10a of the Example 1. Since laminating is performed in the condition in which each layer is upside down during production thereof, expressions of upper and lower sides thereof are opposite to those of the Figures. These expressions are applied to all the following explanations.

First, a right-handed circular polarization polymer cholesteric liquid crystal layer 11 is applied on a protection layer 14, and a left-handed circular polarization polymer cholesteric liquid crystal layer 12 is applied on the right-handed circular polarization polymer cholesteric liquid crystal layer 11, so that a first double layered body 101 composed of the polymer cholesteric liquid crystal layers 11 and 12 is formed. The right-handed circular polarization polymer cholesteric liquid crystal layer 11 has a pitch of a spiral structure which corresponds to a center wavelength of reflection light of 0.70 µm (red). The left-handed circular polarization polymer cholesteric liquid crystal layer 12 has a spiral structure having a pitch which corresponds to a center wavelength of reflection light of 0.55 µm (green). An acrylic adhesive layer 15 is applied on the first double layered body 101. In the case in which the discrimination medium 10a produced in this manner is immediately applied to an article in continuation of the process, no release paper is required. In contrast, in the case in which the discrimination medium 10a is applied to an article after the discrimination medium 10a is preserved and carried once, as shown in FIG. 3 in a cross section, after a release sheet 18 is laminated on the adhesive layer 15 of the discrimination medium 10a, the discrimination medium 10a is wound in a rolled form.

FIG. 4 is a schematic cross-sectional view showing the condition in which the discrimination medium 10a produced in this manner is applied onto the article 30 having a blue surface, and is viewed via a simple determination tool 20. FIG. 5 shows a description of a rotation direction of each circular polarization light shown in FIG. 4. FIG. 4 shows a simple determination tool. As shown in FIG. 6, the simple determination tool has a right-handed circular polarization light filter 21 allowing only right-handed circular polarization light to pass therethrough and a left-handed circular polarization light filter 22 allowing only left-handed circular polarization light to pass therethrough. The simple determination tool is, for example, a device for determining the authenticity of the article, wherein the device is made of a mount such as a cardboard in a card form and facilitates being carried.

As shown in FIG. 4, only right-handed circular polarization light of light which is directed toward the article 30 passes through the right-handed circular polarization light filter 21 and the protection layer 14. Only right-handed circular polarization light of a red wavelength is reflected by the right-handed circular polarization polymer cholesteric liquid crystal layer 11 as it is, and passes through the protection layer 14 and the right-handed circular polarization light filter 21 again so as to be seen as a red color. Other right-handed circular polarization light having wavelengths other than the red wavelength passes through the right-handed circular polarization polymer cholesteric liquid crystal layer 11 and the left-handed circular polarization polymer cholesteric liquid crystal layer 12, and is reflected by the surface of the article 30, thereby being changed to left-handed circular polarization light. Due to this, the left-handed circular polarization light can pass through the left-handed and the right-handed circular polarization polymer cholesteric liquid crystal layers 12 and 11, but cannot pass through the right-handed circular polarization light filter 21. Left-handed circular polarization light passes through the left-handed circular polarization light filter 22, the protection layer 14, and the right-handed circular polarization polymer cholesteric liquid crystal layer 11, and is reflected by the left-handed circular polarization polymer cholesteric liquid crystal layers 12 as green left-handed circular polarization light. Then, the left-handed circular polarization light passes through the right-handed circular polarization polymer cholesteric liquid crystal layer 11, the protection layer 14, and the right-handed circular polarization light filter in turn so as to be seen as a green color. Other left-handed circular polarization light having wavelengths other than the green wavelength passes through the left-handed circular polarization polymer cholesteric liquid crystal layer 12, and is reflected by the surface of the article 30, thereby being changed to right-handed circular polarization light. Due to this, the right-handed circular polarization light cannot pass through the left-handed circular polarization light filter 22. In the case in which the circular polarization light filters are not provided, the reflection light from the article 30 passes through all layers again, and is seen as a blue color. That is, the discrimination medium 10a applied to the article 30 is seen to be approximately white which is formed by mixing red, green, and blue under natural light. The discrimination medium 10a appears to be red when viewed via the right-handed circular polarization light filter. The discrimination medium 10a appears to be green when viewed via the left-handed circular polarization light filter. This unique phenomenon of the discrimination medium 10a which cannot be copied in general is confirmed, so that the authenticity of the article can be determined easily and reliably. Strictly speaking, in the case in which the article is blue, since the article is seen as blue which is made by combining cyan, which absorbs yellow, and magenta, blue is mixed with red and green observed when the discrimination medium 10a is viewed by using the above filter. Due to this, the adhesive layer 15 is preferably black. In this case, since the light having the color of the article is absorbed in the adhesive layer 15, reflection of the light is prevented, so that red and green of the above cholesteric liquid crystal layer can be more clearly seen.

Example 2

FIG. 7 shows a cross section of a discrimination medium 10b of the Example 2. First, a right-handed circular polarization polymer cholesteric liquid crystal layer 11a is applied on a protection layer 14, and a half-wave plate layer 13 is applied on the protection layer via an adhesive layer which is not shown in the Figure. The right-handed circular polarization polymer cholesteric liquid crystal layer 11a has a spiral structure having a pitch which corresponds to a center wavelength of reflection light of 0.70 µm (red). The half-wave plate layer 13 is composed of polyethylene terephthalate (PET), is optically anisotropic, and is adjusted so as to generate a half-wave phase shift of light. A right-handed circular polarization polymer cholesteric liquid crystal layer 11b is applied on the half-wave plate layer 13. As a result, a second double layered body 102 is formed. The right-handed circular polarization polymer cholesteric liquid crystal layer 11b has a spiral structure having a pitch which corresponds to a center wavelength of reflection light of 0.55 µm (green). An acrylic adhesive layer 15 is applied on the second double layered body 102. After a release sheet 18 is laminated on the adhesive layer 15, the discrimination medium 10b is wound in a rolled form.

FIG. 8 is a schematic cross-sectional view showing the condition in which the discrimination medium 10b produced in this manner is applied onto the article 30 having a blue surface, and is viewed via the simple determination tool 20. Only right-handed circular polarization light of light which is directed toward the article 30 passes through the right-handed circular polarization light filter 21 and the protection layer 14. The right-handed circular polarization light of a red wavelength is reflected by the first right-handed circular polarization polymer cholesteric liquid crystal layer 11a as it is, and passes through the protection layer 14 and the right-handed circular polarization light filter 21 again so as to be seen as a red color. Other right-handed circular polarization light having wavelengths other than the red wavelength passes through the first right-handed circular polarization polymer cholesteric liquid crystal layer 11a and the half-wave plate layer 13, thereby being changed to left-handed circular polarization light. Then, the left-handed circular polarization light passes through the second right-handed circular polarization polymer cholesteric liquid crystal layer 11b, and is reflected by the surface of the article 30, thereby being changed to right-handed circular-polarization light. Due to this, the right-handed circular polarization light can pass through the right-handed circular polarization polymer cholesteric liquid crystal layers 11a and 11b, but cannot pass through the right-handed circular polarization light filter 21 since the right-handed circular polarization light is changed to left-handed circular polarization light when passing through the half-wave plate layer 13 again. Left-handed circular polarization light passes through the left-handed circular polarization light filter 22, the protection layer 14, and the first right-handed circular polarization polymer cholesteric liquid crystal layer 11a. The left-handed circular polarization light passes through the half-wave plate layer 13, thereby being changed to right-handed circular polarization light. The right-handed circular polarization light is reflected by the second right-handed circular polarization polymer cholesteric liquid crystal layer 11b as green right-handed circular polarization light. Then, the right-handed circular polarization light passes through the half-wave plate layer 13, the first right-handed circular polarization polymer cholesteric liquid crystal layer, and the protection layer. In this case, the right-handed circular polarization light is changed to left-handed circular polarization light when passing through the half-wave plate layer 13. The left-handed circular polarization light passes through the left-handed circular polarization light filter so as to be seen as a green color. Other right-handed circular polarization light having wavelengths other than the green wavelength passes through the second right-handed circular polarization polymer cholesteric liquid crystal layer 11b, and is reflected by the surface of the article 30, thereby being changed to left-handed circular polarization light. Due to this, when the left-handed circular polarization light passes through the half-wave plate layer 13 again, the left-handed circular polarization light is changed to right-handed circular polarization light, and cannot pass through the left-handed circular polarization light filter 22. In the case in which the circular polarization light filters are not provided, light which is not reflected by the circular polarization polymer cholesteric liquid crystal layers reaches the article 30, and is reflected by the article 30. Then, the reflection light from the article 30 passes through all layers again, and is seen as a blue color. That is, the discrimination medium 10b applied to the article 30 appears to be approximately white which is formed by mixing red, green, and blue under natural light. The discrimination medium 10b appears to be red when viewed via the right-handed circular polarization light filter. The discrimination medium 10b appears to be green when viewed via the left-handed circular polarization light filter. This unique phenomenon of the discrimination medium 10b which cannot be copied in general is confirmed, so that the authenticity of the article can be determined easily and reliably. Strictly speaking, in the case in which the article is blue, since the article is seen in blue which is made by compositing cyan, which absorbs yellow, and magenta, blue is mixed into red and green observed when the discrimination medium 10b is viewed by using the above filter, so that the adhesive layer 15 is desirably black. In this case, since the light having the color of the article is absorbed in the adhesive layer 15, reflection of the light is prevented, so that red and green of the above cholesteric liquid crystal layer can be more clearly seen.

Example 3

On a half-wave plate layer 13 made of PET, a right-handed circular polarization polymer cholesteric liquid crystal layer 11a is applied, and a hologram forming layer 19a having a pattern A is formed by embossing, and an adhesive member 15a is applied on the hologram forming layer 19a. Then, a release sheet 18 is applied on the adhesive member 15a, so that a roll A41 of which a cross section is shown in FIG. 9 is produced.

Next, on a protection layer 14 made of isotropic triacetylcellulose (TAC), a right-handed circular polarization polymer cholesteric liquid crystal layer 11b is applied, and a hologram forming layer 19b having a pattern B is formed by embossing. Then, a hot melt adhesive member 15b is applied on the hologram forming layer 19b, so that a roll B42 of which a cross section is shown in FIG. 10 is produced.

The roll B42 is applied on the roll A41 by applying heat and pressure thereon, so that a discrimination medium 10c as shown in FIG. 11 is produced. This discrimination medium 10c includes a second double layered body 102 which has the first and the second right-handed circular polarization polymer cholesteric liquid crystal layers 11a and 11b and the half-wave plate 13 held therebetween.

The discrimination medium 10c produced in this manner is formed into a seal having a predetermined shape by punching out, and can be applied on the article 30 as shown in FIG. 12.

FIG. 13 is a cross sectional view showing transmission and reflection of a light beam with respect to this seal. When this seal is viewed under natural light, the color and the pattern of the article 30, the color of the first right-handed circular polarization polymer cholesteric liquid crystal layer, the pattern B of the hologram forming layer, the color of the second right-handed circular polarization polymer cholesteric liquid crystal layer, and the pattern A of the hologram forming layer are seen harmoniously. When this seal is viewed via the simple determining apparatus 20, the color of the first right-handed circular polarization polymer cholesteric liquid crystal layer and the pattern B of the hologram forming layer are seen via the right-handed circular polarization light filter 21, and the color of the second right-handed circular polarization polymer cholesteric liquid crystal layer and the pattern A of the hologram forming layer are seen via the left-handed circular polarization light filter 22. This unique phenomenon, which cannot be copied by common methods, is confirmed, so that the authenticity of the article can be determined easily and reliably. Explanations of light transmission will be omitted since the explanations are the same as these of the Example 2 shown in FIG. 8. The adhesive member 15a is preferably black. In this case, since the light having the color of the article is absorbed in the adhesive layer 15, reflection of the light is prevented, so that the color of the above cholesteric liquid crystal layers and the patterns of the hologram forming layers can be more clearly seen.

Example 4

A left-handed circular polarization polymer cholesteric liquid crystal layer 12 is applied on an optical isotropic film layer 16 made of TAC, and a hologram forming layer 19a having a pattern A is formed by embossing. A hot melt adhesive member 15a is applied on the hologram forming layer 19a, so that a roll D44 of which a cross section is shown in FIG. 14 is produced.

Next, a protection film 14 is adhered on a base film 17, a right-handed circular polarization polymer cholesteric liquid crystal layer 11 is applied on the protection film 14, and a hologram forming layer 19b having a pattern B is formed by embossing. Then, a hot melt adhesive member 15b, which can be melted and adhered at a temperature lower than the adhesive layer 15a, is applied on the adhesive member 15b, so that a roll C43 of which a cross section is shown in FIG. 10 is produced.

The roll C43 is applied on the roll D44 by applying heat and pressure thereon, and a discrimination medium 10d as shown in FIG. 16 is produced. This discrimination medium 10d includes a first double layered body 101 in which the right-handed circular polarization polymer cholesteric liquid crystal layer 11 and the left-handed circular polarization polymer cholesteric liquid crystal layer 12 are laminated.

For example, as shown in FIG. 17, the discrimination medium 10d produced in this manner can be applied to the article 30 by using a hot press 50. The base film 17 of the discrimination medium 10d is moved between the hot press 50 and the article 30 by a winding machine (not shown in the Figure). The hot press 50 heated is repeatedly moved upward and downward, heats the discrimination medium 10d, and compressively bonds the discrimination medium 10d to the article 30 when moved downward. In the discrimination medium 10d, only a portion thereof compressively bonded is adhered to the article 30, and remains adhered thereto. When the hot press 50 is moved upward, the other portion thereof separates from the article 30.

When the discrimination medium 10d applied to the article 30 in this manner is viewed under natural light, the color and the pattern of the article 30, the color of the right-handed circular polarization polymer cholesteric liquid crystal layer 11 and the pattern B of the hologram forming layer 19b, and the color of the left-handed circular polarization polymer cholesteric liquid crystal layer 12 and the pattern A of the hologram forming layer 19a are seen harmoniously. When the discrimination medium 10d is viewed via the simple determining apparatus 20, as shown in a schematic cross sectional view of FIG. 18, the color of the right-handed circular polarization polymer cholesteric liquid crystal layer 11 and the pattern B of the hologram forming layer 19b are seen via the right-handed circular polarization light filter 21, and the color of the left-handed circular polarization polymer cholesteric liquid crystal layer 12 and the pattern A of the hologram forming layer 19a are seen via the left-handed circular polarization light filter 22. This unique phenomenon, which cannot be copied by common methods, is confirmed, so that the authenticity of the article can be determined easily and reliably. Explanations of light transmission will be omitted since the explanations are the same as these of the Example 1 shown in FIG. 4. The adhesive member 15a is preferably black. In this case, since the light having the color of the article is absorbed in the adhesive layer 15, reflection of the light is prevented, so that the color of the above cholesteric liquid crystal layers and the patterns of the hologram forming layers can be more clearly seen.

In the rolls A to D of the Examples 3 and 4, the hologram forming layer 19 is formed on the cholesteric liquid crystal layers 11 and 12 by embossing thereat. Instead of this, in one example as shown in FIG. 19, the hologram forming layer 19 can be formed on the protection layer 14, the half-wave plate layer 13, or the isotropic layer 16 by embossing thereat, the cholesteric liquid crystal layer 11 or 12 can be applied to the hologram forming layer 19, and the adhesive layer 15 can be applied to the cholesteric liquid crystal layer 11 or 12, so that a roll E45 can be produced, and can be used instead of the rolls A to D.

Example 5

A carbonate pigment composed of black carbon is mixed into the adhesive layer 15a which is applied on the rolls A and D used in the Examples 3 and 4, so that a black hot melt member 15 (thermal bonding adhesive) is produced. The discrimination medium 10 having the black adhesive layer obtained in this manner is slit by a width of 1 to 5 mm by a micro-slitter or other means so as to have a film form. As shown in FIG. 20, when, for example, an upper layer, an intermediate layer, and a lower layer are laminated, and a gift certificate is thereby produced, the discrimination medium 10 having a film form is put therebetween, and windows W are perforated on the upper layer. As a result, an article 30 can be produced in which the discrimination medium 10 is sewn thereinto so as to have a thread form as shown in FIG. 21. When this thread portion is viewed under natural light, two kinds of patterns which are overlapped and the color having metallic luster are seen integrally. When this thread portion is viewed via the simple determination tool 20, the patterns and the colors having metallic luster are seen separately via the respective filters thereof.

The present invention is not limited to the above Examples, and various modifications can be made. In the above Examples, for example, although the cholesteric liquid crystal layer is formed such that light having a center wavelength of 0.70 μm (red) is reflected, and the other cholesteric liquid crystal layer is formed such that light having a center wavelength of 0.55 μm (green) is reflected, the present invention is not limited to this. The pitch or the refractive index of each cholesteric liquid crystal layer may be appropriately set, so that the light reflected by the respective cholesteric liquid crystal layers may have the same color. In the above Examples, although natural light is irradiated onto the discrimination medium, the present invention is not limited to this. For example, infrared light is irradiated onto the discrimination medium.

Figure 1:
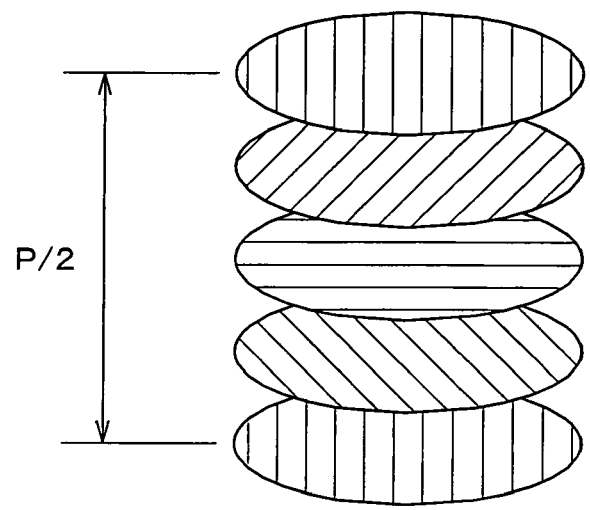
FIG. 1 is a perspective view showing a cholesteric liquid crystal for explaining a principle of the present invention.
Figure 2:
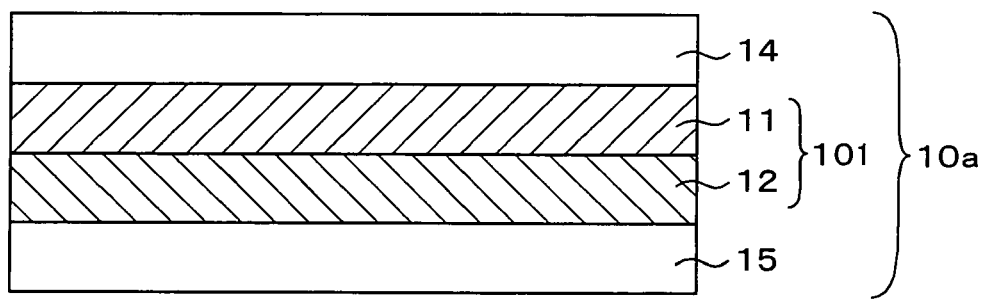
FIG. 2 is a cross-sectional view showing a discrimination medium of the first aspect of the present invention.
Figure 3:
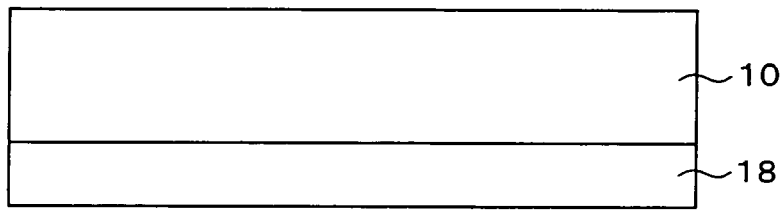
FIG. 3 is a cross-sectional view showing the condition in which a release sheet is applied to the discrimination medium.
Figure 4:
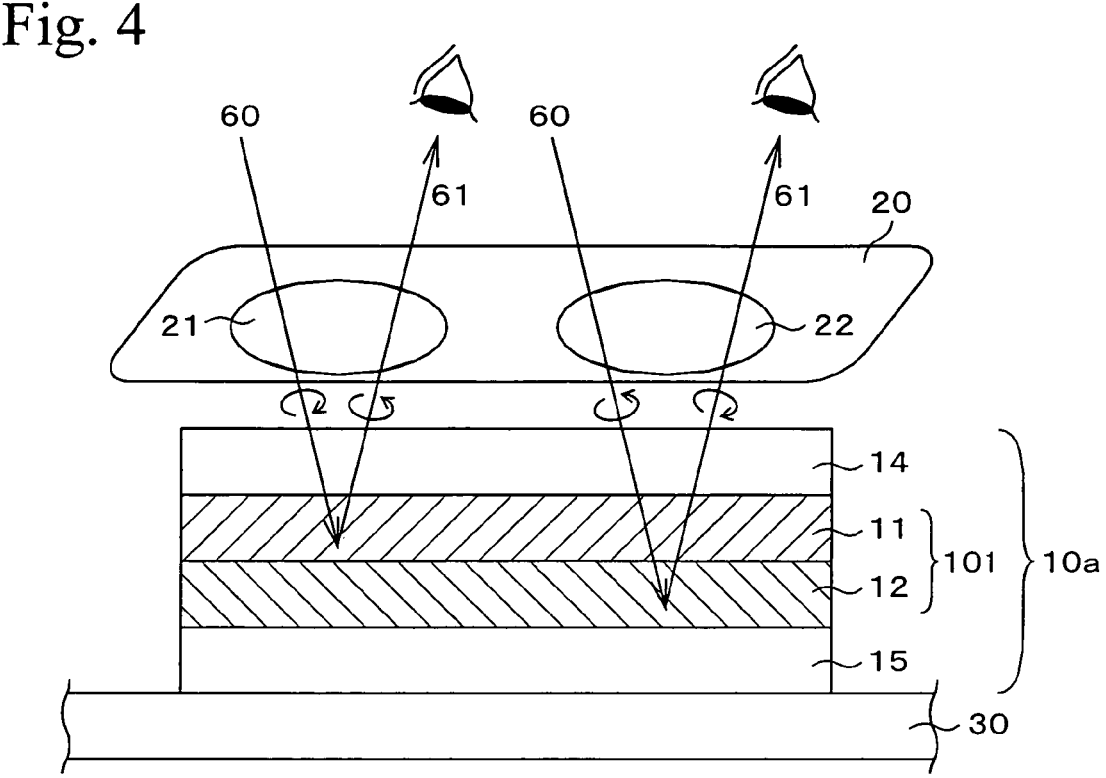
FIG. 4 is a cross-sectional view schematically showing light transmission and reflection of light to a discrimination medium of the first aspect of the present invention applied to an article.
Figure 5:
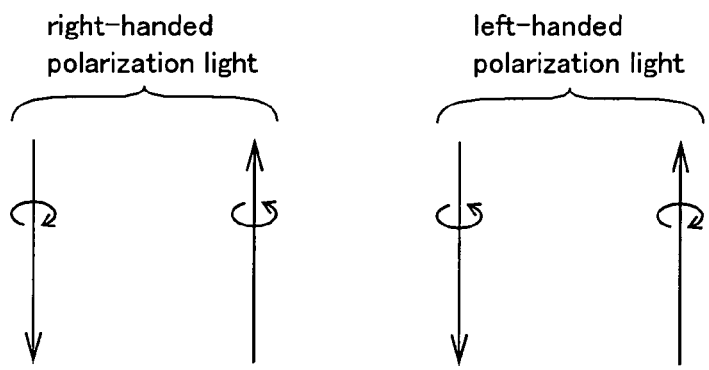
FIG. 5 is a schematic diagram for explaining notation definition of rotation direction of circular polarization.
Figure 6:
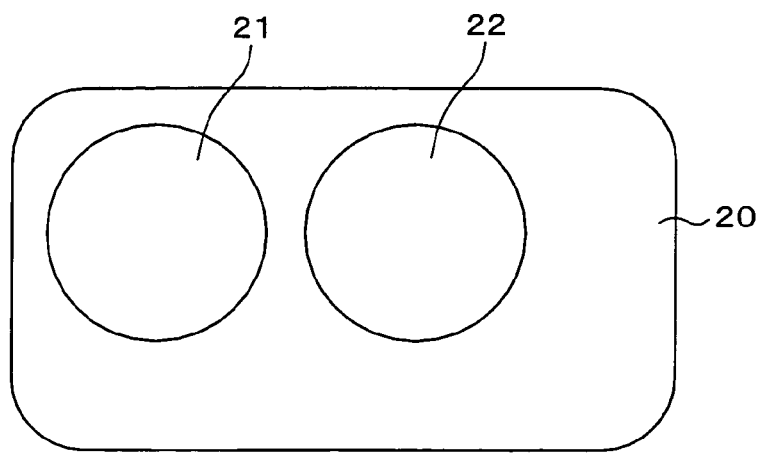
FIG. 6 is a plan view showing an example of a simple discrimination apparatus.
Figure 7:
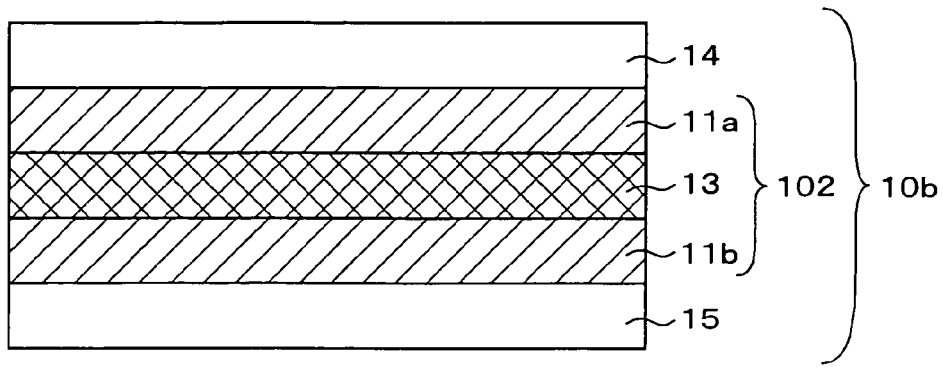
FIG. 7 is a cross-sectional view showing a laminated structure of the second aspect of the present invention.
Figure 8:
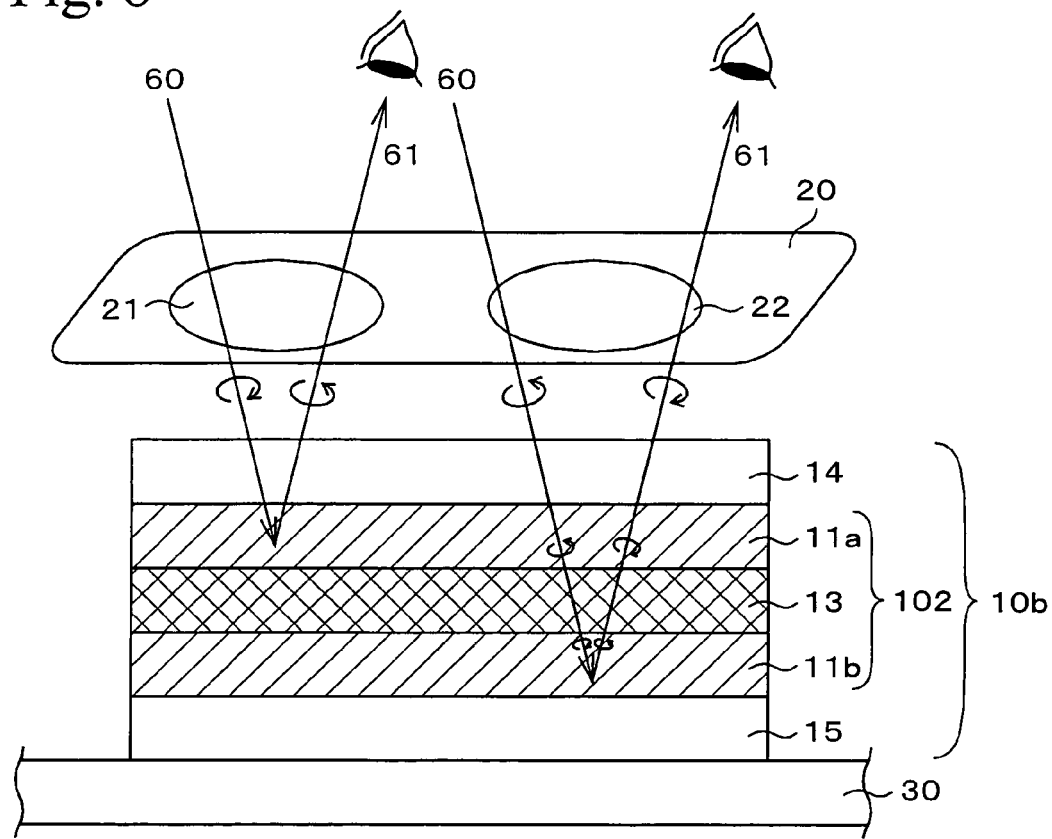
FIG. 8 is a cross-sectional view schematically showing light transmission and reflection of light to a discrimination medium of the second aspect of the present invention applied to an article.
Figure 9:
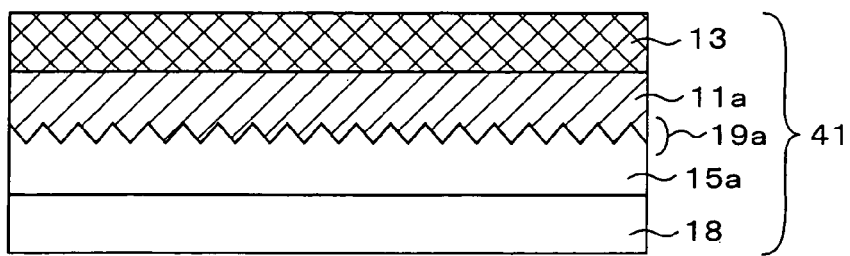
FIG. 9 is a cross-sectional view of roll A as an intermediate member of a discrimination medium of the third aspect of the present invention.
Figure 10:
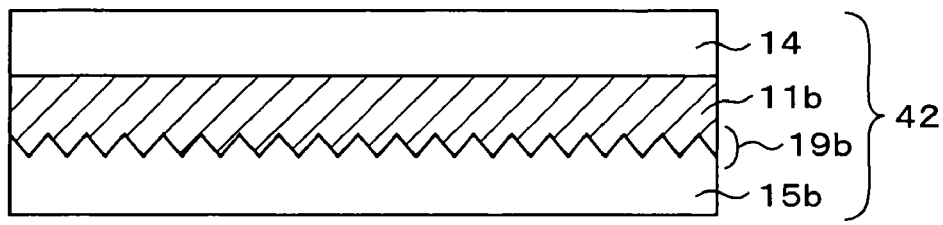
FIG. 10 is a cross-sectional view of roll B as an intermediate member of a discrimination medium of the third aspect of the present invention.
Figure 11:
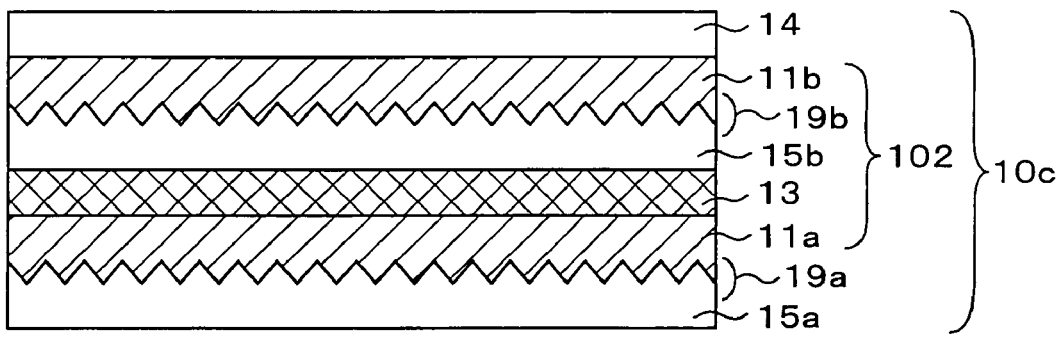
FIG. 11 is a cross-sectional view showing a discrimination medium of the third aspect of the present invention.
Figure 12:
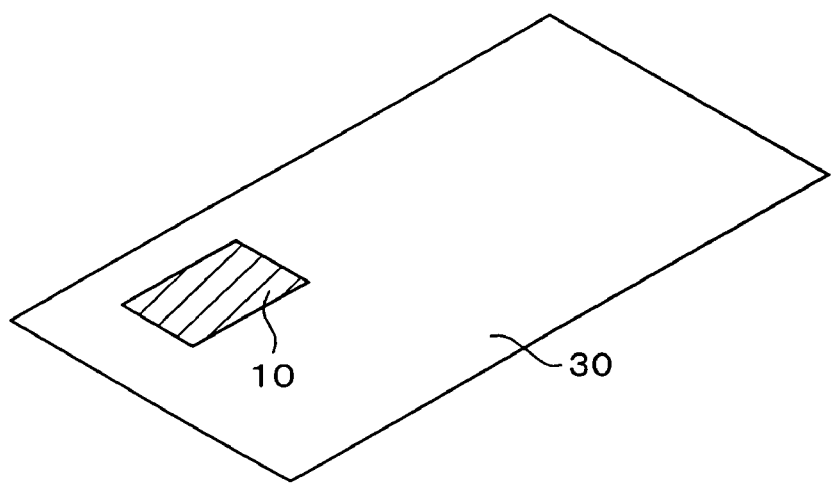
FIG. 12 is a perspective view showing a state in which a sealing discrimination medium is applied to an article.
Figure 13:
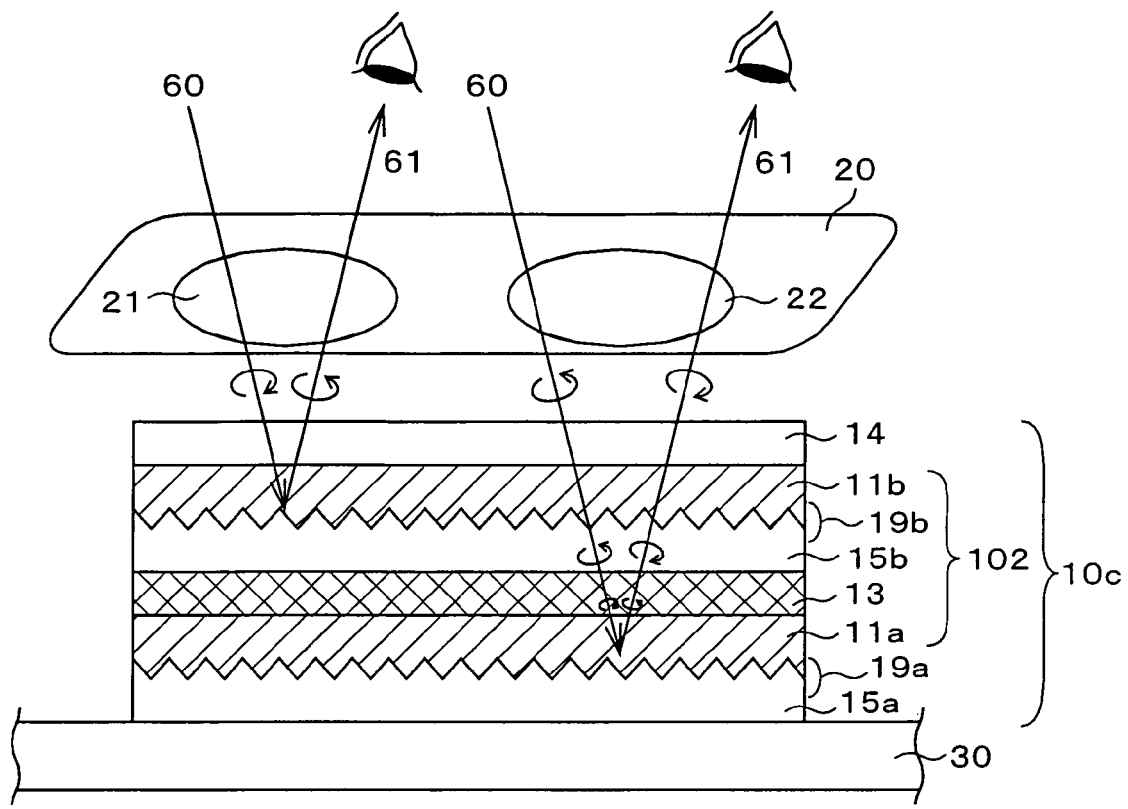
FIG. 13 is a cross-sectional view schematically showing light transmission and reflection of light to a discrimination medium of the third aspect of the present invention applied to an article.
Figure 14:
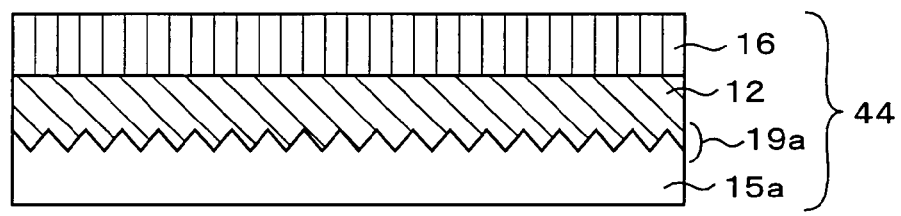
FIG. 14 is a cross-sectional view of roll D as an intermediate member of a discrimination medium of the fourth aspect of the present invention.
Figure 15:
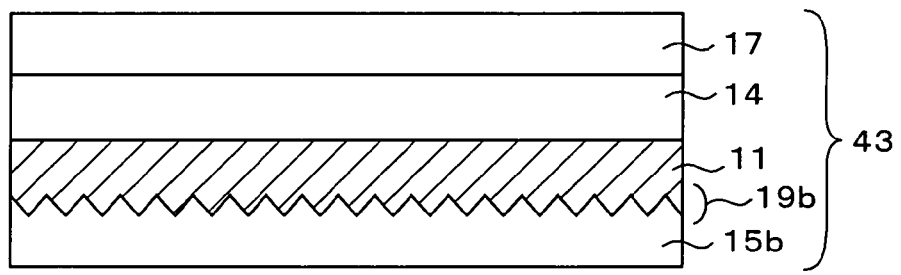
FIG. 15 is a cross-sectional view of roll C as an intermediate member of a discrimination medium of the fourth aspect of the present invention.
Figure 16:
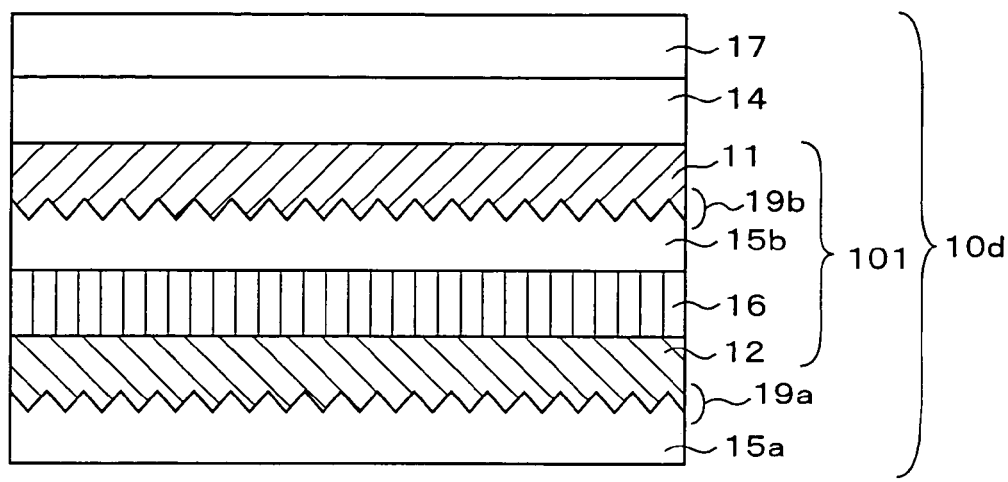
FIG. 16 is a cross-sectional view showing a discrimination medium of the fourth aspect of the present invention.
Figure 17A:
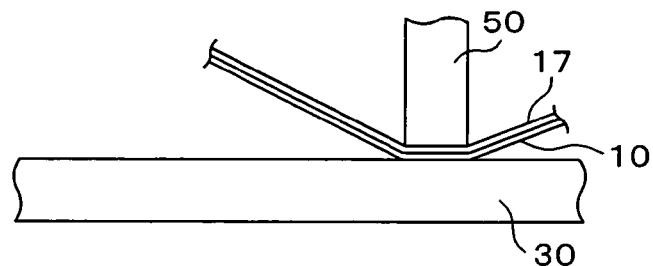
FIGS. 17A and 17B are front views schematically showing states in which a discrimination medium is applied to an article by a hot press.
Figure 17B:
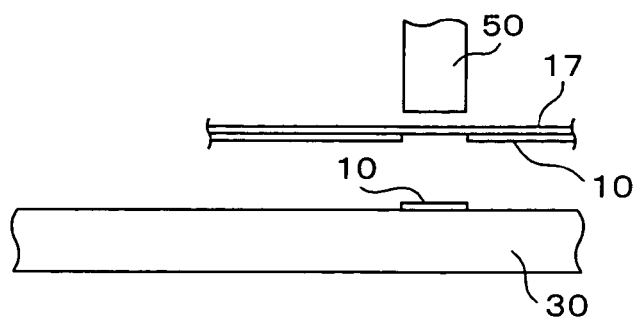
Figure 18:
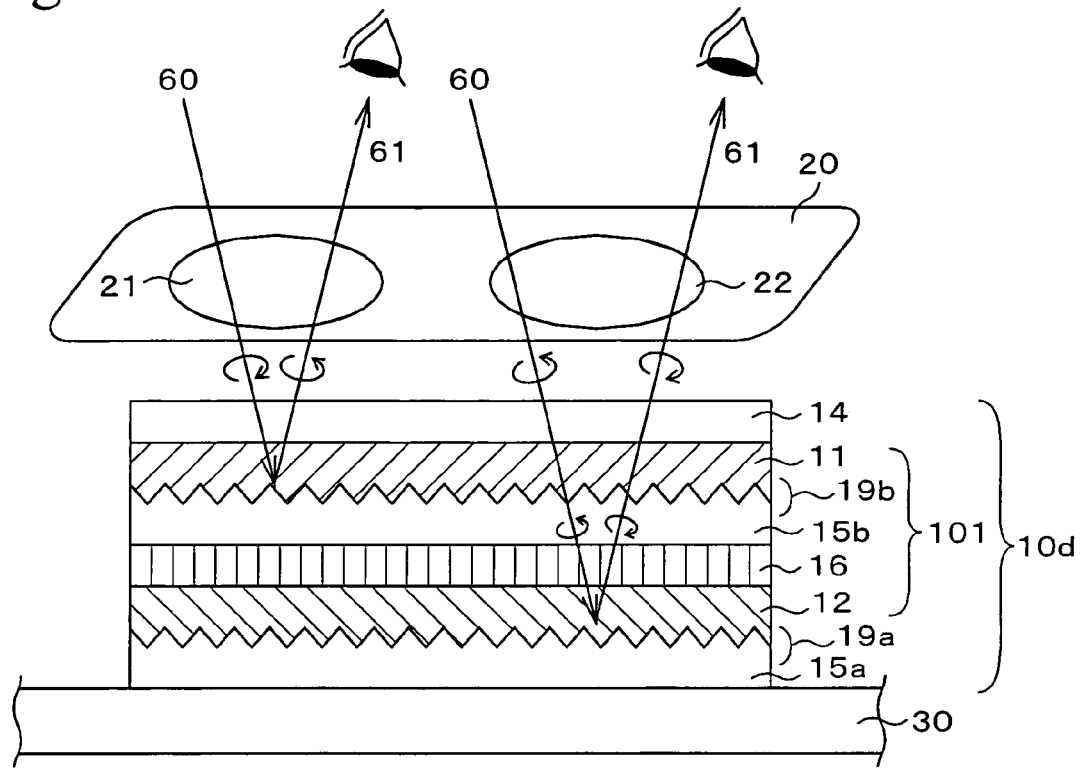
FIG. 18 is a cross-sectional view schematically showing light transmission and reflection of light to a discrimination medium of the fourth aspect of the present invention applied to an article.
Figure 19:
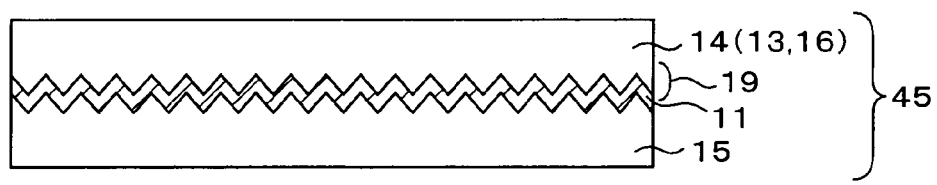
FIG. 19 is a cross-sectional view of another example of a roll as an intermediate member of the third and the fourth aspects of the present invention.
Figure 20:
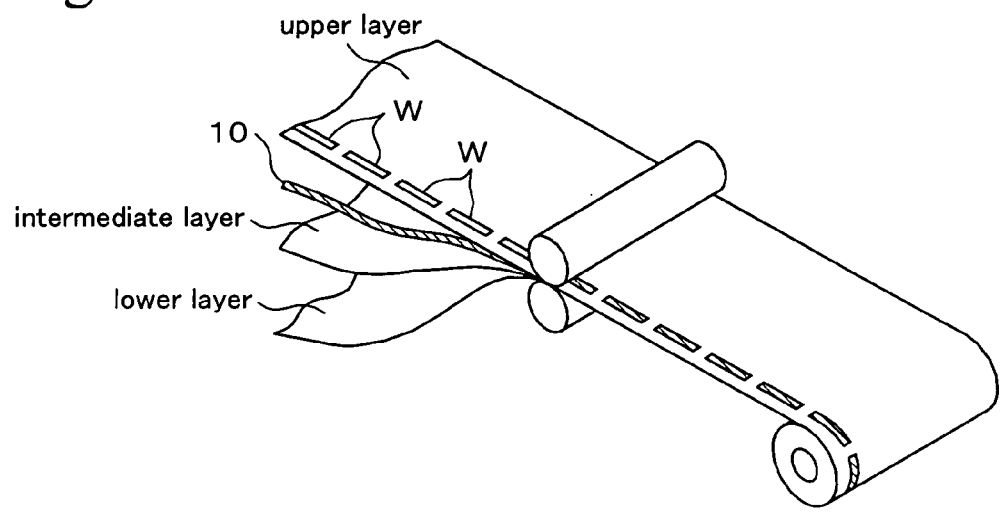
FIG. 20 is a perspective view conceptually showing the condition in which a discrimination medium is held by an article in a thread form.
Figure 21:
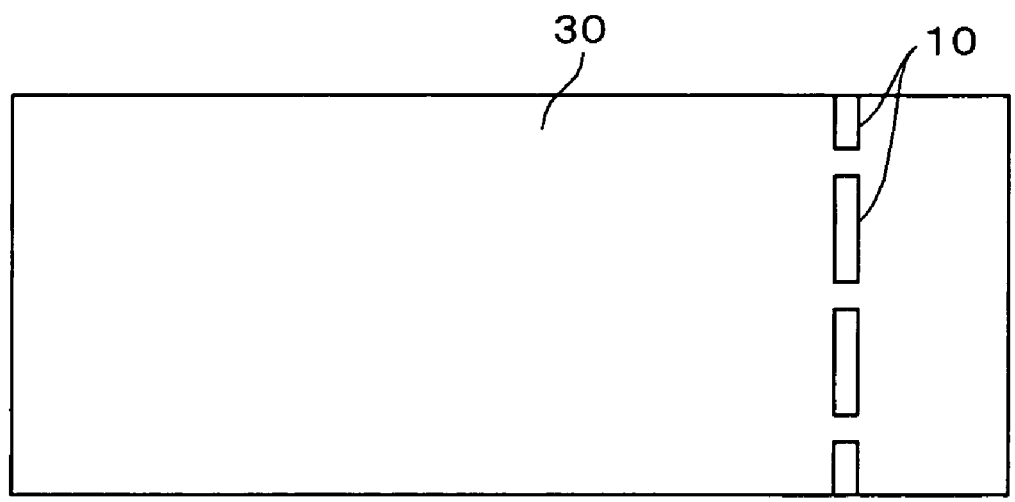
FIG. 21 is a plan view showing an example of an article in which a discrimination medium is sewed in a thread form.

EXPLANATION OF REFERENCE NUMERALS 10 discrimination medium,
11, 11a, 11b right-handed circular polarization polymer cholesteric liquid crystal layer,
12 left-handed circular polarization polymer cholesteric liquid crystal layer,
13 half-wave plate layer,
14 protection film layer,
15, 15a, 15b adhesive layer,
16 isotropic film layer,
17 base film,
18 release sheet,
19, 19a, 19b hologram forming layer,
20 simple discrimination apparatus,
21 right-handed circular polarization light filter,
22 left-handed circular polarization light filter,
30 article,
41, 42, 43, 44, 45 roll,
50 hot press,
60 incident-light,
61 exiting light,
101 first double layered body,
102 second double layered body.

The invention claimed is:

1. A discrimination medium for determining the authenticity of an article by providing an optically discriminable mark on the article, comprising:

a first double layered body having a right-handed circular polarization polymer cholesteric liquid crystal layer and a left-handed circular polarization polymer cholesteric liquid crystal layer which are stacked, the right-handed circular polarization polymer cholesteric liquid crystal layer reflecting right-handed circular polarization light having a predetermined wavelength, the left-handed circular polarization polymer cholesteric liquid crystal layer reflecting left-handed circular polarization light having a predetermined wavelength; and a protection film layer provided on an outside of the first double layered body, the protection film layer protecting the circular polarization polymer cholesteric liquid crystal layers, the outside of the first double layered body being opposite to the article.

2. A discrimination medium for determining the authenticity of an article by providing an optically discriminable mark on the article, comprising:

a second double layered body having two same direction circular polarization polymer cholesteric liquid crystal layers which are stacked, the two same direction circular polarization polymer cholesteric liquid crystal layers reflecting right-handed circular polarization light having a predetermined wavelength or left-handed circular polarization light having a predetermined wavelength;

a half-wave plate layer provided between the circular polarization polymer cholesteric liquid crystal layers, the half-wave plate layer changing right-handed circular polarization of transmitted light to left-handed circular polarization thereof or changing left-handed circular polarization of transmitted light to right-handed circular polarization thereof; and a protection film layer provided on an outside of the second double layered body, the protection film layer protecting the circular polarization polymer cholesteric liquid crystal layers, the outside of the second double layered body being opposite to the article.

3. The discrimination medium according to claim 1, the discrimination medium further comprising:

a corrugated hologram forming layer provided on at least one of the two circular polarization polymer cholesteric liquid crystal layers.

4. The discrimination medium according to claim 1, the discrimination medium further comprising:

a corrugated hologram forming layer provided on at least one side of the protection layer and the article, the side being proximate to the circular polarization polymer cholesteric liquid crystal layer, wherein the circular polarization polymer cholesteric liquid crystal layer is formed on the hologram forming layer, and has an uniform thickness so as to extend along the corrugated shape of the hologram forming layer.

5. The discrimination medium according to claim 1, wherein the circular polarization polymer cholesteric liquid crystal layers of the first double layered body have spiral structures having pitches which are different from each other.

6. The discrimination medium according to claim 3, wherein the hologram forming layers of the first double layered body have patterns which are different from each other.

7. The discrimination medium according to claim 1, the discrimination medium further comprising:

an adhesive layer provided on an outside of the discrimination medium, the outside being proximate to the article.

8. The discrimination medium according to claim 7, wherein the adhesive layer contains a black pigment.

9. A discrimination method for discriminating a discrimination medium for determining the authenticity of an article by providing an optically discriminable mark on the article, the discrimination method comprising:

a first double layered body having a right-handed circular polarization polymer cholesteric liquid crystal layer and a left-handed circular polarization polymer cholesteric liquid crystal layer which are stacked, the right-handed circular polarization polymer cholesteric liquid crystal layer reflecting right-handed circular polarization light having a predetermined wavelength, the left-handed circular polarization polymer cholesteric liquid crystal layer reflecting left-handed circular polarization light having a predetermined wavelength; and a protection film layer provided on an outside of the first double layered body, the protection film layer protecting the circular polarization polymer cholesteric liquid crystal layers, the outside of the first double layered body being opposite to the article, the method including:

viewing the discrimination medium on the article via a simple determination tool having a filter allowing only right-handed circular polarization light to pass therethough and a filter allowing only left-handed circular polarization light to pass therethough, wherein color of the right-handed circular polarization polymer cholesteric liquid crystal layer is seen via the filter allowing only right-handed circular polarization light to pass therethough, and color of the left-handed circular polarization polymer cholesteric liquid crystal layer is seen via the filter allowing only left-handed circular polarization light to pass therethough, whereby the authenticity of the article is determined.

10. A discrimination method for discriminating a discrimination medium for determining the authenticity of an article by providing an optically discriminable mark on the article, the discrimination method comprising:

a second double layered body having two same direction circular polarization polymer cholesteric liquid crystal layers which are stacked to each other, the two circular polarization polymer cholesteric liquid crystal layers reflecting right-handed circular polarization light having a predetermined wavelength or left-handed circular polarization light having a predetermined wavelength;

a half-wave plate layer provided between the circular polarization polymer cholesteric liquid crystal layers, the half-wave plate layer changing right-handed circular polarization of transmitted light to left-handed circular polarization thereof or changing left-handed circular polarization of transmitted light to right-handed circular polarization thereof; and a protection film layer provided on an outside of the second double layered body, the protection film layer protecting the circular polarization polymer cholesteric liquid crystal layers, the outside of the second double layered body being opposite to the article, the method including:

viewing the discrimination medium on the article via a simple determination tool having a filter allowing only right-handed circular polarization light to pass therethough and a filter allowing only left-handed circular polarization light to pass therethough, wherein color of the circular polarization polymer cholesteric liquid crystal layer proximate to the protection layer and color of the circular polarization polymer cholesteric liquid crystal layer proximate to the article are separately seen via the filter allowing only right-handed circular polarization light to pass therethough and the filter allowing only left-handed circular polarization light to pass therethough, whereby the authenticity of the article is determined.

11. The discrimination method for determining the authenticity of an article according to claim 9, the discrimination medium further comprising:

a corrugated hologram forming layer provided on at least one of the two circular polarization polymer cholesteric liquid crystal layers of the first double layered body, the method comprising:

viewing the discrimination medium on the article via a simple determination tool having a filter allowing only right-handed circular polarization light to pass therethough and a filter allowing only left-handed circular polarization light to pass therethough, wherein color of the right-handed circular polarization polymer cholesteric liquid crystal layer is seen via the filter allowing only right-handed circular polarization light to pass therethough, and a pattern of the hologram is seen therevia when the right-handed circular polarization polymer cholesteric liquid crystal layer has the corrugated hologram forming layer, and color of the left-handed circular polarization polymer cholesteric liquid crystal layer is seen via the filter allowing only left-handed circular polarization light to pass therethough and a pattern of the hologram is seen therevia when the left-handed circular polarization polymer cholesteric liquid crystal layer has the corrugated hologram forming layer, whereby the authenticity of the article is determined.

12. The discrimination method for determining the authenticity of an article according to claim 10, the discrimination medium further comprising:

a corrugated hologram forming layer provided on at least one of the circular polarization polymer cholesteric liquid crystal layers of the second double layered body, the method comprising:

viewing the discrimination medium on the article via a simple determination tool having a filter allowing only right-handed circular polarization light to pass therethough and a filter allowing only left-handed circular polarization light to pass therethough, wherein color of the circular polarization polymer cholesteric liquid crystal layer proximate to the protection layer is seen via the one of the filters, and a pattern of the hologram is seen therevia when the circular polarization polymer cholesteric liquid crystal layer proximate to the protection layer has the corrugated hologram forming layer, and color of the circular polarization polymer cholesteric liquid crystal layer proximate to the article is seen via the other filter, and a pattern of the hologram is seen therevia when the circular polarization polymer cholesteric liquid crystal layer proximate to the article has the corrugated hologram forming layer, whereby the authenticity of the article is determined.

13. The discrimination medium according to claim 2, the discrimination medium further comprising:

a corrugated hologram forming layer provided on at least one of the two circular polarization polymer cholesteric liquid crystal layers.

14. The discrimination medium according to claim 2, the discrimination medium further comprising:

a corrugated hologram forming layer provided on at least one side of the protection layer and the article, the side being proximate to the circular polarization polymer cholesteric liquid crystal layer, wherein the circular polarization polymer cholesteric liquid crystal layer is formed on the hologram forming layer, and has an uniform thickness so as to extend along the corrugated shape of the hologram forming layer.

15. The discrimination medium according to claim 2, wherein the circular polarization polymer cholesteric liquid crystal layers of the second double layered body have spiral structures having pitches which are different from each other.

16. The discrimination medium according to claim 13, wherein the hologram forming layers of the second double layered body have patterns which are different from each other.

17. The discrimination medium according to claim 2, the discrimination medium further comprising:

an adhesive layer provided on an outside of the discrimination medium, the outside being proximate to the article.

18. The discrimination medium according to claim 17, wherein the adhesive layer contains a black pigment.

* * * * *